US011173610B2

(12) United States Patent
Gothoskar et al.

(10) Patent No.: US 11,173,610 B2
(45) Date of Patent: Nov. 16, 2021

(54) METHOD AND SYSTEM FOR ROBOT CONTROL USING VISUAL FEEDBACK

(71) Applicant: Vicarious FPC, Inc., Union City, CA (US)

(72) Inventors: Nishad Gothoskar, Union City, CA (US); Miguel Lazaro-Gredilla, Union City, CA (US); Yasemin Bekiroglu, Union City, CA (US); Abhishek Agarwal, Union City, CA (US); Dileep George, Union City, CA (US)

(73) Assignee: Vicarious FPC, Inc., Union City, CA (US)

( * ) Notice: Subject to any disclaimer, the term of this patent is extended or adjusted under 35 U.S.C. 154(b) by 0 days.

(21) Appl. No.: 17/098,111

(22) Filed: Nov. 13, 2020

(65) Prior Publication Data

US 2021/0138656 A1     May 13, 2021

Related U.S. Application Data

(60) Provisional application No. 62/934,615, filed on Nov. 13, 2019.

(51) Int. Cl.
| | |
|---|---|
| *G05B 15/00* | (2006.01) |
| *G05B 19/00* | (2006.01) |
| *B25J 9/16* | (2006.01) |
| *G06K 9/62* | (2006.01) |
| *G06K 9/00* | (2006.01) |
| *G06T 7/73* | (2017.01) |
| *H04N 5/247* | (2006.01) |

(Continued)

(52) U.S. Cl.
CPC .............. *B25J 9/1697* (2013.01); *B25J 9/163* (2013.01); *B25J 9/1605* (2013.01); *B25J 9/1664* (2013.01); *G06K 9/00664* (2013.01); *G06K 9/6256* (2013.01); *G06N 20/00* (2019.01); *G06T 7/73* (2017.01); *G06T 7/80* (2017.01); *H04N 5/247* (2013.01); *B25J 9/1669* (2013.01); *G06T 2207/20081* (2013.01); *G06T 2207/30244* (2013.01)

(58) Field of Classification Search
CPC ........ B25J 9/1697; B25J 9/1605; B25J 9/163; B25J 9/1664; B25J 9/1669; G06T 7/80; G06T 7/73; G06T 2207/20081; G06T 2207/30244; G06N 20/00; G06K 9/00664; G06K 9/6256; H04N 5/247
See application file for complete search history.

(56) References Cited

U.S. PATENT DOCUMENTS

| | | | | |
|---|---|---|---|---|
| 6,681,151 | B1 * | 1/2004 | Weinzimmer | ......... B25J 9/1697 |
| | | | | 219/121.85 |
| 6,816,755 | B2 * | 11/2004 | Habibi | ................... B25J 9/1697 |
| | | | | 318/568.11 |

(Continued)

OTHER PUBLICATIONS

Atkeson, Christopher G., "Learning Arm Kinematics and Dynamics", Ann. Rev. Neurosci. 1989, 12 : 157-183.

(Continued)

*Primary Examiner* — Harry Y Oh
(74) *Attorney, Agent, or Firm* — Jeffrey Schox; Diana Lin

(57) ABSTRACT

A method for robot control using visual feedback including determining a generative model S100, training the generative model S200, and controlling the robot using the trained generative model S300.

20 Claims, 12 Drawing Sheets

(51) Int. Cl.
    *G06T 7/80* (2017.01)
    *G06N 20/00* (2019.01)

(56) References Cited

U.S. PATENT DOCUMENTS

| | | | | |
|---|---|---|---|---|
| 9,205,564 | B2 | 12/2015 | Popovic et al. | |
| 2004/0243282 | A1* | 12/2004 | Watanabe | B25J 9/1697 700/259 |
| 2005/0159842 | A1* | 7/2005 | Ban | B25J 19/023 700/245 |
| 2010/0004778 | A1* | 1/2010 | Arimatsu | B25J 9/1697 700/214 |
| 2016/0059419 | A1* | 3/2016 | Suzuki | B25J 9/1697 700/114 |
| 2017/0252922 | A1* | 9/2017 | Levine | G06N 3/08 |
| 2020/0156255 | A1* | 5/2020 | Soltani Bozchalooi | B25J 9/1697 |
| 2021/0122039 | A1* | 4/2021 | Su | B25J 9/163 |
| 2021/0122056 | A1* | 4/2021 | Menon | B25J 19/027 |

OTHER PUBLICATIONS

Beeson, Patrick , et al., "TRAC-IK: An Open-Source Library for Improved Solving of Generic Inverse Kinematics", 2015 IEEE-RAS 15th International Conference on Humanoid Robots (Humanoids), Nov. 3-5, 2015.
Biostein, Steven D., "Least-squares fitting of two 3-D point sets", IEEE Transactions on Pattern Analysis and Machine Intelligence, Oct. 1987.
Bradski, Gary , "The OpenCV Library", https://ng.techweb.com/authds/gateway?gateway=true&return=https%3A%2F%2Fwww.drdobbs.com%2Fopen-source%2Fthe-opencv-library%2F184404319, Nov. 1, 2000.
Faugeras, O.D., et al., "Camera Self-Calibration: Theory and Experiments", Conference: European Conference on Computer Vision, Jan. 2006, DOI: 10.1007/3-540-55426-2_37.
Fraser, Clive S., "Digital Camera Self-Calibration", ISPRS Journal of Photogrammetry & Remote Sensing 52 (1997) 149-159.
Hosoda, Koh , et al., "Adaptive Hybrid Control for Visual and Force Servoing in an Unknown Environment", IEEE Robotics and Automation Magazine, Jan. 1999, DOI: 10.1109/100.740464.
Hosoda, Koh , et al., "Versatile visual servoing without knowledge of true Jacobian", Intelligent Robots and Systems 94. 'Advanced Robotic Systems and the Real World', IROS '94. Proceedings of the IEEE/RSJ/GI International Conference on vol. 1.
Ikits, Milan , et al., "Kinematic Calibration Using a Plane Constraint", Proceeding of the 1997 IEEE International Conference on Robotics and Automation, Albuquerque, New Mexico, Apr. 1997.
Kragic, Danica , et al., "Survey on Visual Servoing for Manipulation", https://www.researchgate.net/publication/2403046_Survey_on_Visual_Servoing_for_Manipulation, Feb. 2002.
Lepetit, Vincent, et al., "EPnP: An Accurate O(n) Solution to the PnP Problem", Int J Comput Vis, Apr. 15, 2008.
Hu, Doug C., et al., "On the Limited Memory BFGS Method for Large Scale Optimization", Mathematical Programming 45 (1989), pp. 503-528.
Liu, Yun , et al., "Uncalibrated visual serving of robots using a depth-independent interaction matrix", Sep. 2006, IEEE Transactions on Robotics 22(4):804-817.
Marchand, E., et al., "ViSP for visual serving: a generic software platform with a wide class of robot control skills", IEEE Robotics and Automation Magazine, Institute of Electrical and Electronics Engineers, 2005, 12 (4), pp. 40-52.
Nister, David , "An Efficient Solution to the Five-Point Relative Pose Problem", IEEE Transactions on Pattern Analysis and Machine Intelligence, vol. 26, Issue: 6, Jun. 2004, pp. 756-770.
Paszke, Adam , et al., "Automatic differentiation in PyTorch", 31st Conference on Neural Information Processing System (NIPS 2017), Long Beach, CA, USA.
Piepmeier, J.A., et al., "Uncalibrated Dynamic Visual Servoing", IEEE Transactions on Robotics and Automation, vol. 20, Issue: 1, Feb. 2004, pp. 143-147.
Quigley, Morgan , et al., "ROS: an open-source Robot Operating System", Jan. 2009, Conference: ICRA Workshop on Open Source Software.
Saxena, Aseem , et al., "Exploring Convolutional Networks for End-to-End Visual Servoing", IEEE ICRA 2017, submitted Jun. 10, 2017, arXiv:1706.03220v1.
Shademan, Azad , et al., "Robust Jacobian Estimation for Uncalibrated Visual Servoing", 2010 IEEE International Conference on Robotics and Automation, Anchorage Convention District, May 3-8, 2010, Anchorage, Alaska, USA.
Tsai, Roger Y., et al., "A New Technique for Fully Autonomous and Efficient 3D Robotics Hand/Eye Calibration", IEEE Transactions on Robotics and Automation, vol. 5, No. 3, Jun. 1989.
Yoshimi, Billibon H., et al., "Active, Uncalibrated Visual Servoing", Proceedings of the 1994 IEEE International Conference on Robotics and Automation, Published 1994, DOI:10.1109/ROBOT.1994.350995.
Zhang, Zhengyou , "A Flexible New Technique for Camera Calibration", Dec. 2000, IEEE Transactions on Pattern Analysis and Machine Intelligence 22(11):1330-1334.

* cited by examiner

METHOD AND SYSTEM FOR ROBOT CONTROL USING VISUAL FEEDBACK

CROSS-REFERENCE TO RELATED APPLICATIONS

This application claims the benefit of U.S. Provisional Application No. 62/934,615 filed 13 Nov. 2019, which is incorporated in its entirety by this reference.

TECHNICAL FIELD

This invention relates generally to the robotics field, and more specifically to a new and useful method for robot control using visual feedback in the robotics field.

DESCRIPTION OF THE PREFERRED EMBODIMENTS

The following description of the preferred embodiments of the invention is not intended to limit the invention to these preferred embodiments, but rather to enable any person skilled in the art to make and use this invention.

1. Overview

Figure 1:
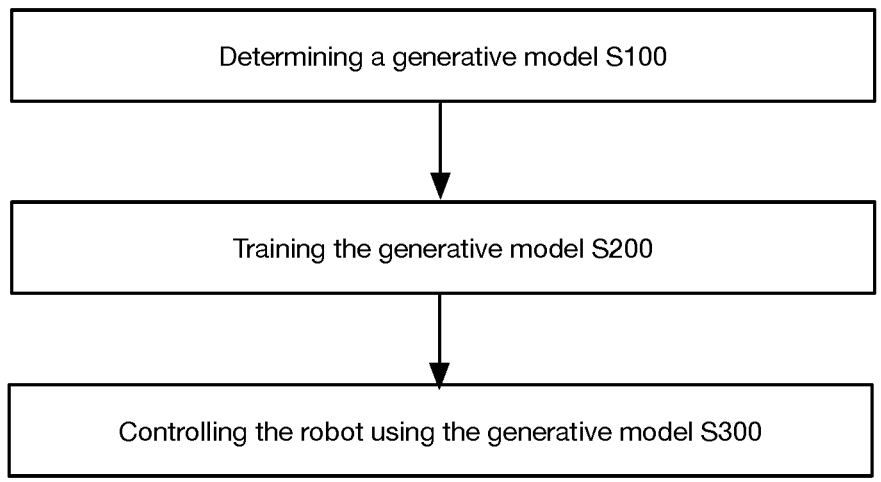
FIG. 1 is a schematic representation of the method.

As shown in FIG. 1, the method for robot control using visual feedback preferably includes: determining a generative model S100; training the generative model S200; controlling the robot using the trained generative model S300; and/or any other suitable elements.

Figure 2:
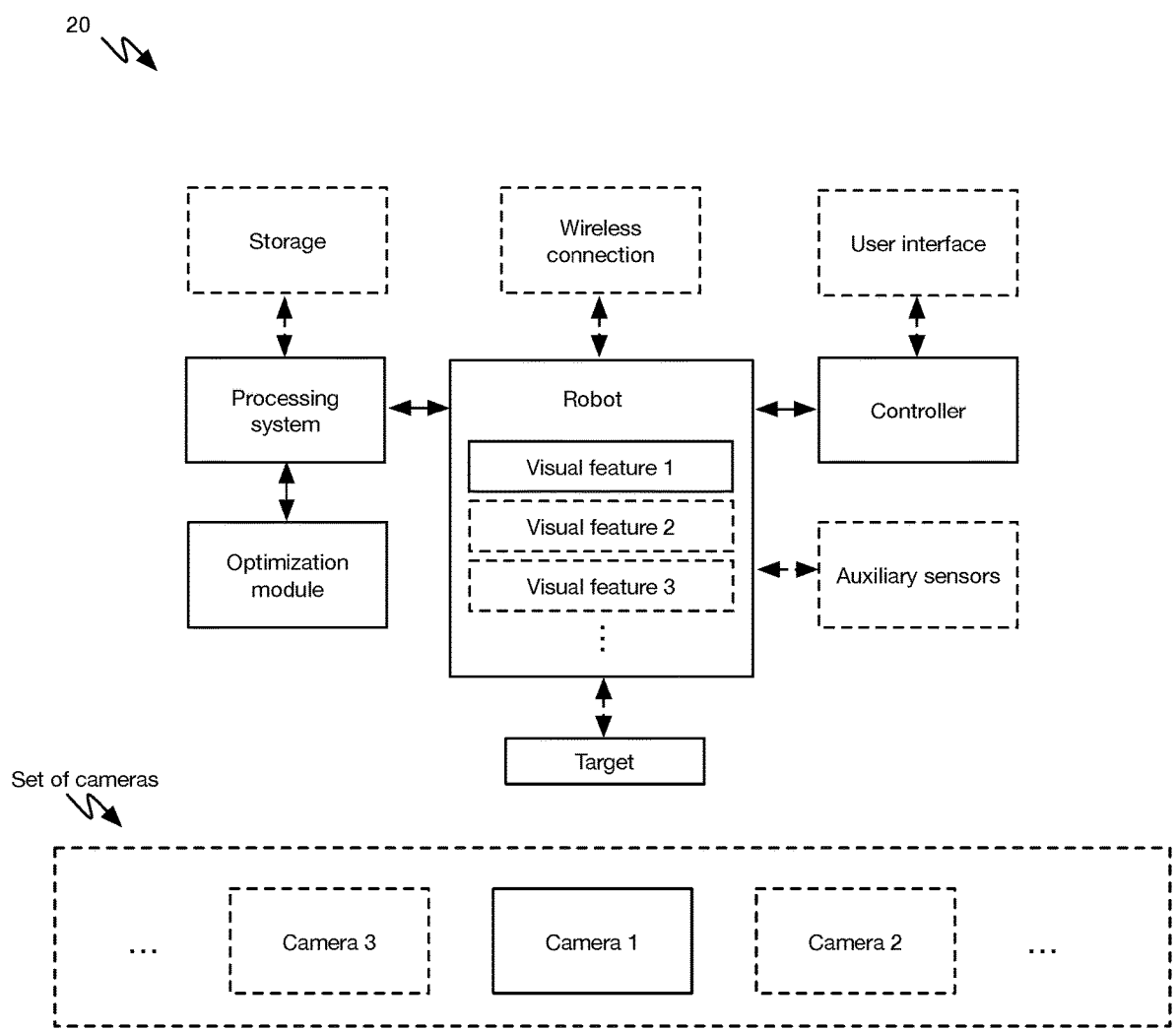
FIG. 2 is a schematic representation of the system.

As shown in FIG. 2, the system for robot control using visual feedback preferably includes: a robot, a controller, a processing system, a set of cameras, visual features, a target, an optimization module, and/or any other suitable elements.

2. Examples

In a first example, the method for controlling a robot with an end-effector, includes: determining a generative model comprising a set of variables and a set of parameters, wherein the set of variables comprises observed variables and hidden variables, and wherein the set of parameters comprises camera parameters (e.g., defined as part of a camera sub-model), structure parameters (e.g., defined as part of a structural sub-model), and optionally kinematics parameters (e.g., defined as part of a kinematics sub-model) relating variables within the set. The generative model is then trained by sampling training data, optionally initializing all or a subset of the model parameters, determining values for subsets of the model parameters through a series of training epochs, and determining the final values for all model parameters. Sampling the training data can include sampling a set (e.g., timeseries) of images and robot actions, wherein each image depicts the robot, the end-effector, and a feature rigidly connected to the end-effector. The actions can be treated as an observed variable within the set of variables during training. Feature pixel locations of the feature are then detected in the set of images, wherein the feature pixel locations (e.g., pixel coordinates) can also be treated as an observed variable during training. The camera parameters can then be initialized (e.g., using factory calibration estimates, photogrammetry methods, stereo methods, etc.). Optimized camera parameters, optimized structure parameters, and an end-effector pose are then calculated based on the initialized camera parameters and the feature pixel locations (e.g., using the camera sub-model and the structural sub-model), wherein the end-effector pose is a hidden variable of the set of variables. The kinematics parameters can optionally be calculated based on the end-effector pose and the action (e.g., using the kinematics model and optionally a joint state determined based on the action and a prior joint state). Final (e.g., updated) camera parameters, structure parameters, and optionally kinematics parameters can then be calculated based on the action, the feature pixel locations, the optimized camera parameters, and optimized structure parameters, and can optionally be calculated based on the optimized kinematics parameters, the estimated joint state, and/or the end effector pose (e.g., using an end-to-end optimization).

The trained generative model (e.g., with the final camera parameters) can then be used to control the robot. This can include sampling an image of the scene and determining a target pose for the end effector (e.g., based on the image, based on a target placement location, etc.). Determining the target pose can include selecting a target position of the robot in the scene and determining the pose of the end-effector corresponding to the target position. The feature can then be extracted from the scene, and used to determine a current end effector pose (e.g., using the trained camera sub-model and trained structural sub-model). Alternatively, the current end effector pose (e.g., for an analysis timestep) can be estimated from a prior end effector pose. An action can then be determined based on the difference between the target end effector pose and the current end effector pose. In variants using a joint controller, the current and target end effector poses can be transformed into current and target joint states, respectively, using the trained kinematics model, wherein the difference between the current and target joint states can be used to determine the action.

3. Benefits

The method can confer several benefits over conventional systems.

First, variants of the method can enable visual control using an arbitrary, uncalibrated robot observed by an arbitrary number of uncalibrated cameras. In some variants, no specific information is available about the cameras, robot, structure, target, or scene. These variants of the method enable faster and more efficient robot setup and on-the-fly recalibration.

Second, variants of the method can enable consistent convergence of end-to-end learning by initializing the camera parameters using triangulation or structure from motion, and learning a first version of both the camera parameters and the structure parameters based on the initialized camera parameters before learning a final version of the parameters during the final end-to-end optimization. This technique enables the method to escape local minima and converge to a global optimum. This technique can also use significantly less training data than conventional methods, while achieving comparable accuracy.

Third, variants of the method can enable accurate control of the robot from only observing the actions sent to a noisy controller and image features.

Fourth, variants of the method explicitly model noise so that the robot can be controlled using a noisy controller and/or a noisy robot for tasks that require precision, such as grasping and tight-fit insertions.

Fifth, variants of the method leverage a modular model that cleanly maps to the system components. This allows parameters of the model to be quickly retrained when a given system component is replaced, by fixing the parameters associated with the remaining components and relearning the parameters associated with the new component.

However, the method and system can confer any other suitable benefits.

4. System

Figure 3:
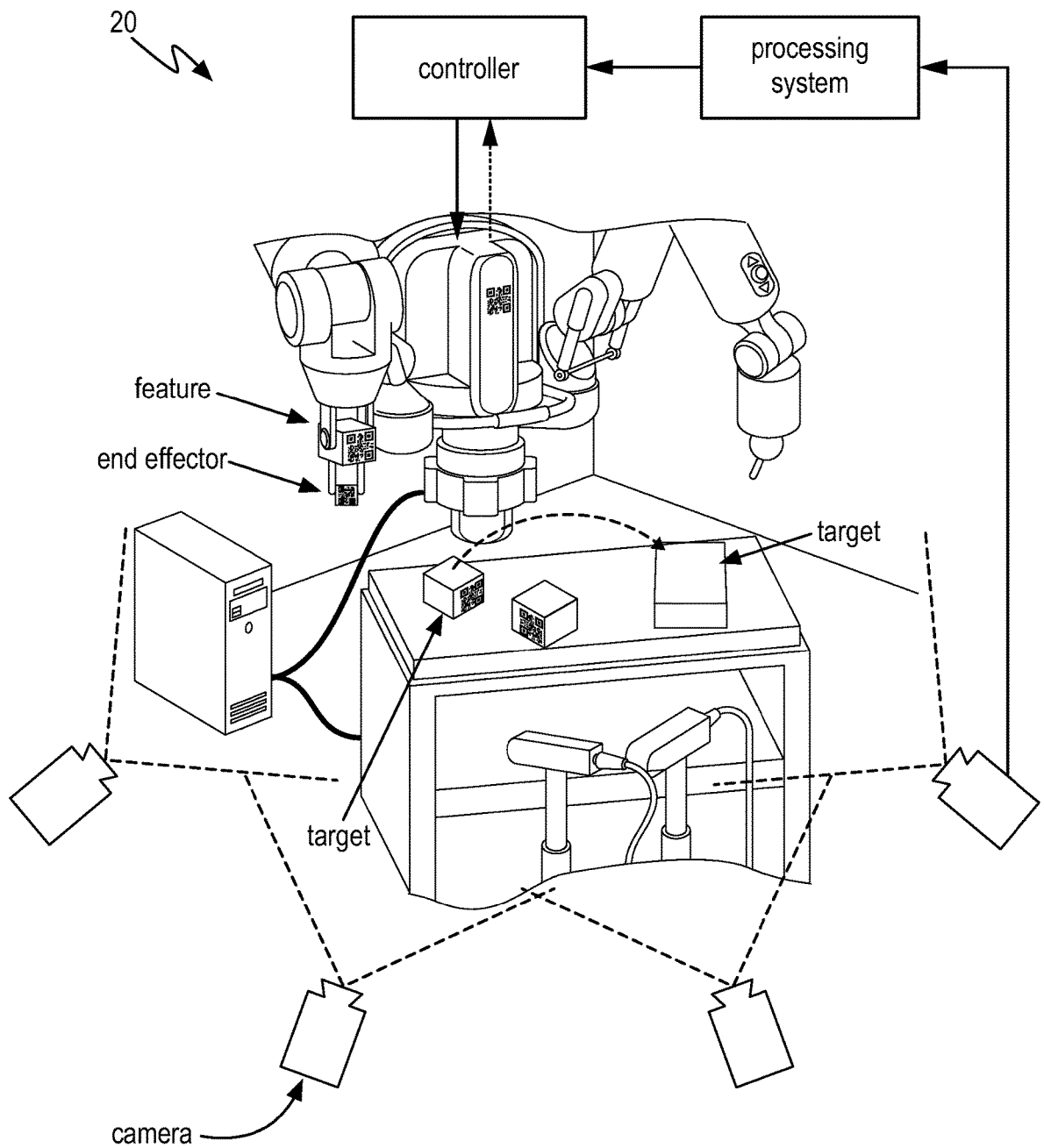
FIG. 3 depicts an example of the system and scene.

The method is preferably used to control a system including: a robot, a controller, a processing system, a set of cameras, visual features, and a target. The system can optionally include an optimization module and/or any other suitable elements. FIG. 3 depicts an example physical arrangement of a set of the system components.

The robot can function to retain, move, and place items in an environment. The robot can include: a robotic arm, a legged robot, a drone, gantry, dispensing system with at least 1 degree of freedom (e.g., 4 degrees of freedom, 2-4 degrees of freedom, 3 degrees of freedom, etc.), and/or any other suitable manipulator.

The robot can include an end-effector. Examples of end-effectors that can be used include: a gripper, dispenser, container, actuated hand, vacuum, suction cup, or any other suitable end-effector.

The robot can be uncalibrated, calibrated, or otherwise operate in a known location of the robot relative to the camera (i.e. robot position/orientation known within the camera reference frame).

In some variations, the robot can include an arm with: one or more links each with a predetermined length (e.g., less than 6 inches, less than 1 foot, etc.): one or more joints (e.g., collinear, orthogonal, rotational, twisting, revolving, etc.) which rotatably connect two or more links, servos, and/or any other suitable component.

However, the robot can be otherwise configured.

The controller can function to move the robot based on received commands (e.g., actions). The controller preferably controls the robot to execute control instructions. The control instructions are preferably actions. Actions can include: target component state (e.g., joint state, end-effector state, etc.), component change parameters (e.g., direction, velocity, acceleration, deceleration, distance, timeframes, etc.), and/or other instructions. Actions can be specified in cartesian space, in joint space, and/or any other suitable space. Actions can be determined using the trained model, but can alternatively be manually determined, randomly determined, be a set of rules, or otherwise determined.

Examples of the controller include: a joint space controller (e.g., commands changes in joint states), a Cartesian space controller (commands end-effector pose transformations), feature space controller, and/or any other suitable controller.

However, the controller can be otherwise configured.

The processing system can function to perform the method. For example, the processing system can: receive an image of the robot, the end-effector, and the feature; determine a feature pixel location for the feature in the image; determine a target feature pixel location for the feature based on a target placement location; determine an action for a next time stamp based on the target placement location and a trained generative model; and control the robot to perform the action. The processing system can optionally train and/or retrain the model. All or a portion of the processing system is preferably local to the robot, but can alternatively be remote (e.g., a remote computing system), distributed between the local and remote system, distributed between multiple local systems, distributed between multiple robots, and/or otherwise configured. The processing system preferably includes one or more processors (e.g., CPU, GPU, TPU, microprocessors, etc.). The processing system can optionally include memory (e.g., RAM, flash memory, etc.) or other nonvolatile computer medium configured to store instructions for method execution, repositories, and/or other data. However, the processing system can be otherwise configured.

The one or more visual features can be used to determine the end-effector position and/or robot joint positions. The one or more visual features are preferably rigidly connected to the robot, such as to the end-effector, to one or more joints, and/or any other robot component to be tracked. Each visual feature is preferably visually unique within the scene. Each visual feature is preferably symmetric along one or more axes (e.g., radial axis, cartesian axes, etc.), such as to determine rotation. The one or more visual features can include: one or more colors (e.g., red, green, blue, and/or various shades or combinations) and/or be black and white, can be raised (e.g., less than 1 mm, less than 2 mm, less than 5 mm, etc.) or smooth (e.g., planar), or otherwise configured. Each visual feature can include one or more parameters (e.g., shape size, shape arrangement, pattern alignment with the robot, pattern pose relative to the robot, etc.), which are preferably known, but can alternatively be unknown. Examples of visual features include: an imperfection on the end-effector, fastener, reflective element, light, beacon (e.g., IR beacon), and/or any other visual feature. Each visual feature can be a an array of shapes (e.g., circles, squares, triangles, diamonds, etc.), a checkerboard, an ArUco pattern, a ChArUco pattern, multiple CharuCo patterns (e.g., arranged as a checkerboard, grid, etc.), a circle grid pattern, and/or any other visual feature. However, the visual features can be otherwise configured. Alternatively, other locating features (e.g., RFID tags, ultrasound tags, radar tags, Bluetooth beacons, etc.) can be used. The system can optionally include a feature detector configured to detect the visual feature within an image. The feature detector can be: a neural network, pattern recognizer, image processing system, and/or other detector. The feature detector can leverage local techniques (e.g., edge detection, corner detection, blob detection, SIFT transform, etc.), curvature techniques, motion techniques (e.g., optical flow), shape-based techniques (e.g., thresholding, blob extraction, template matching Hough transforms, etc.), and/or other techniques The robot is preferably arranged within a scene. The scene can be a real-world environment, and can include: the robot or portions thereof (e.g., the end effector, the arm, etc.), the visual feature, a set of target positions for the robot and/or end effector, the volume of potential end effector positions, and/or any other suitable system or environmental component. The scene can be defined by the furthest extent of the robotic arm, the furthest extent of the volume of potential end effector positions, or otherwise defined. The scene can be associated with an origin frame, but can alternatively be defined in an end effector frame, camera frame, or any other suitable frame. The scene can be: a manufacturing station, a manufacturing plant, a retail location, and/or any other suitable scene. The scene can be mobile (e.g., relative to the real-world environment) or static.

The set of cameras can function to capture images of the scene. The set of cameras can be uncalibrated prior to training the generative model or calibrated. The set of cameras can be arranged such that they view the scene, but can alternatively be within the scene. The cameras' fields of view preferably encompass the entirety of the scene (e.g., individually or collectively), but can alternatively encompass a subset of the scene (e.g., individually or collectively). The set of cameras can include one or more cameras (e.g., 1, 2, 3, etc.). Each camera of the set is associated with intrinsic and extrinsic parameters. The intrinsic parameters can be determined at a manufacturing facility and/or learned by the method. The extrinsic parameters can be learned by the method and/or predetermined. However, the set of cameras can be otherwise configured.

The system can be used with a set of target, which can be used to determine the next action during inference. The targets are preferably target poses, but can alternatively be target objects, target volumes, target positions, target points, and/or any other suitable target. For example, the target can include: a target location for the end-effector positioning, a target location within a picking volume, a target location within a placement volume, a target object for manipulation, and/or any other suitable target. The targets are preferably for the end effector, but can alternatively be for the joints (e.g., be a set of target joint states). The target can be a variable determined by the method, a predetermined variable, and/or any other suitable variable. The target poses are preferably determined by a planning module that determines the target pose based on an identified insertion target or grasp target (e.g., based on the same or different image of the scene; examples shown in FIG. 10 and FIG. 11), but can alternatively be determined by the trained model (e.g., wherein the planning module provides the target object's position or pose to the trained model, which then outputs the corresponding target end effector pose or joint state) or otherwise determined. The targets are preferably defined in the scene frame (e.g., using scene coordinates, origin coordinates, etc.), but can alternatively be defined in end effector coordinates, camera frame coordinates, or any other suitable coordinates. However, the target can be otherwise configured.

The system can be used with a set of frames (e.g., coordinate systems). Frames that can be used include: the base frame of the robot, an origin frame of the scene (e.g., the same as or different from the base frame), an end effector frame defined with respect to the end effector, joint reference fames defined with respect to each joint, camera frame (e.g., defined relative to the camera; location of objects relative to the camera; pixel coordinates; etc.) and/or any other suitable frame of reference. The optimization module can function to perform the optimizations of the method. The optimization module can be executed by the processing system and/or any other suitable system. The optimization module can include: Quasi-Newton method limited memory BFGS which approximates the Hessian matrix to make updates to the parameters.

The optimization module train the generative model using minibatches of the training data samples to help the generative model escape local minima. For example, the optimization module includes a version of L-BFGS that first learns on random minibatches of the training data samples before a final period of learning with all of the training data samples.

The optimization module can include a comparison function. Examples of the comparison function include: the frobenius norm, the L1 norm, L2 norm, quaternion error, quadratic error, and/or any other suitable comparison function. However, the optimization module can be otherwise configured.

The system can additionally or alternatively include: auxiliary sensors (e.g., acoustic sensors, depth sensors, etc.), wireless connections (e.g., WiFi, cellular, Internet), user interfaces, storage (e.g., storing the parameters, storing the trained model, storing the data sample queue, etc.), and/or other components.

However, the system 20 can include any other suitable components.

5. Method

The method for robot control using visual feedback preferably includes: determining a generative model S100; training the generative model S200; controlling the robot using the trained generative model S300; and/or any other suitable elements.

The method can function to determine a generative model that can be used to control a robot. One or more of the method steps can be performed using the processing system (e.g., automatically), manually performed, or otherwise performed. One or more steps can be performed in series or in parallel for the same or different instances of the method (e.g., for the same robot, for different robots). The method is preferably performed using the system described above, but can alternatively be performed using any other system.

5.1 Determining a Generative Model S100.

Figure 6:
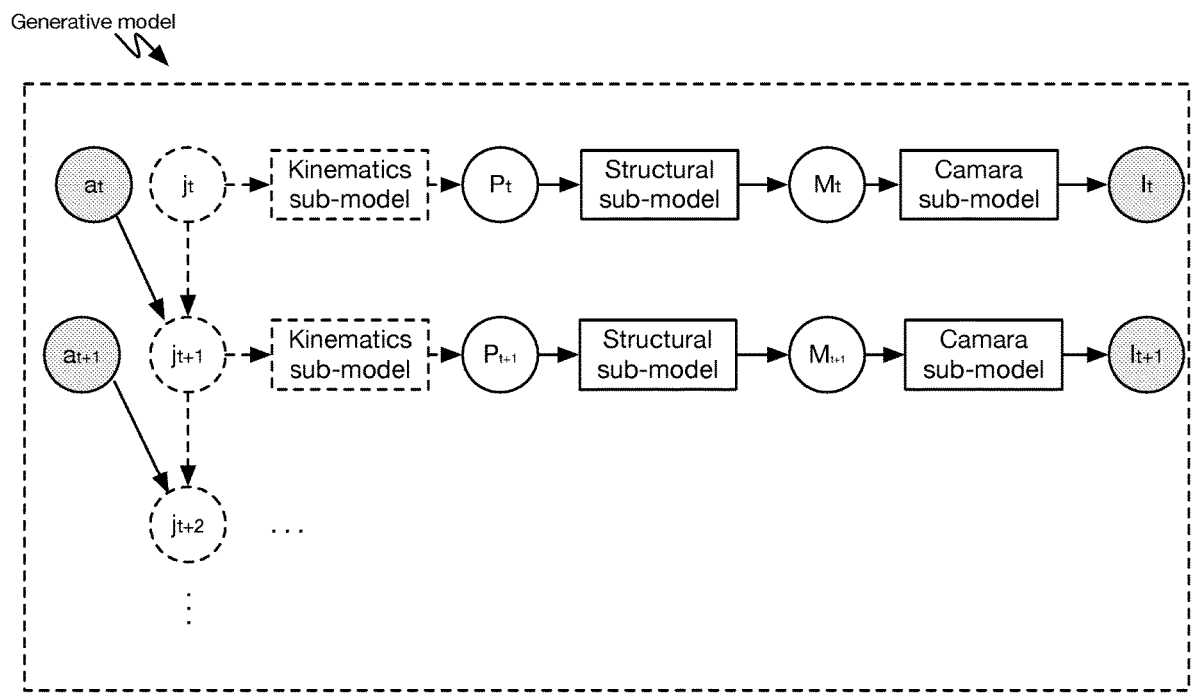
FIG. 6 depicts a variant of S100.
Figure 7:
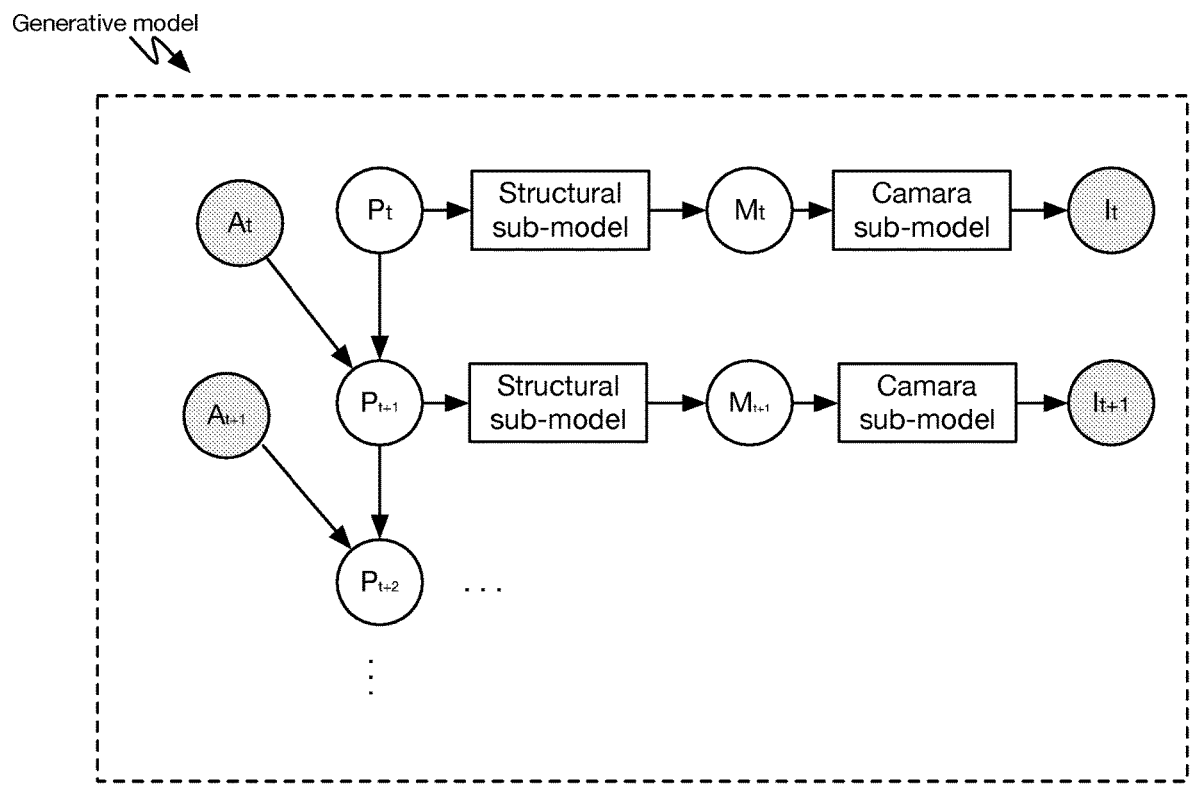
FIG. 7 depicts a variant of S100.

Determining a generative model S100 can function to define the generative model that can be trained (e.g., learned) and used to control the robot. The generative model preferably includes model variables (e.g., hidden or observed), one or more sub-models (e.g., a camera sub-model, a structural sub-model, a kinematics sub-model, etc.), and/or any other suitable elements (e.g., as depicted in FIGS. 6 and 7).

The model variables can include: optional joint states ($j_t$), end-effector pose ($P_t$), 3D coordinates of the feature points ($M_t$), feature pixel coordinates ($I_t$), actions (e.g., $a_t$, $A_t$, etc.), and/or any other variables.

The joint states preferably represent the state of each joint at time t, wherein each joint has n degrees of freedom (e.g., $j_t[i]$ is the state of joint i at time t). The joint state can include the joint angle, joint pose, link pose, any other suitable joint or arm parameter, and/or changes thereof. The joint state can be in the joint frame, the origin frame, and/or any other suitable frame. The joint state is preferably a hidden variable, but in some variants, the joint state can be an observed variable.

In a first variant, the joint state can be directly determined from control instruction (e.g., when a joint state controller is used). In a first example, the joint state is calculated from the prior known joint state and the joint state change commanded by the controller. In a second example, the joint state is a set of changes from the prior joint state (e.g., known or unknown), where the changes are extracted directly from the controller command.

In a second variant, the joint state can be indirectly determined by calculating the joint state from commanded actions (e.g., from the last timestep) during inference.

In a third variant, the joint state is not determined.

The joint states preferably relate the commanded actions to the end-effector pose via the kinematics sub-model. For example, the joint state can be calculated from a known end effector pose using the kinematics sub-model, or an end effector pose can be calculated from a known joint state using the kinematics sub-model.

However, the joint states can be otherwise determined.

The pose of the end-effector ($P_t$) is preferably the pose of the end effector within the scene at time t. The pose can be defined as the cartesian pose in the origin frame, but can alternatively be the pose of the end-effector in the joint frame. The pose of the end-effector is preferably a hidden variable, but can alternatively be an observed variable. The end-effector pose is related to the feature pose via the structural sub-model.

In a first variant, the pose of the end-effector is determined based on end-effector pose and commanded actions from prior timestep (e.g., when a cartesian controller is used). In a first example, the end-effector pose is calculated from the prior known end-effector pose and the pose change commanded by the controller. In a second example, the end-effector pose is a set of changes from the prior end-effector pose (e.g., known or unknown), where the changes are extracted directly from the controller command.

In a second variant, the pose of the end-effector is determined based on kinematics sub-model and joint states from current timestep (e.g., $P_t = K_R(j_t)$).

However, the pose of the end-effector can be otherwise determined.

The feature pose (e.g., 3D coordinates of the feature points) ($M_t$) at time t is preferably the pose of the visual feature attached to the end effector at time t. The feature pose is preferably defined in the origin frame, but can additionally or alternatively be in any other frame. The feature pose can be determined based on feature pixel coordinates ($I_t$) and the camera model (e.g., during training, during inference). The feature pose is preferably a hidden variable, but can alternatively be an observed variable. The feature pose can be related to the end effector pose via the structural model (e.g., $M_t = S_F(P_t)$). However, the feature pose can be otherwise determined.

The feature pixel coordinates ($I_t$) at time t are preferably determined from an image (e.g., during training and/or inference) and/or estimated using the generative model (e.g., during training). Feature pixel coordinates preferably represent the pixel coordinates of the one or more visual features in the image. The feature pixel coordinates are preferably an observed variable. The feature pixel coordinates are preferably determined from the image using a feature detector. The feature pixel coordinates are preferably related to the feature pose via the camera sub-model (e.g., $I_t = C_V(M_t)$). However, the feature pixel coordinates can be otherwise determined.

The actions (e.g., $a_t$, $A_t$, etc.) are preferably used to control the robot. The actions are preferably commanded (e.g., output) by the controllers. The action at time t preferably determines the robot parameter for the next timestep t+1, but can alternatively determine the robot parameter for other timesteps (e.g., t+2, t, etc.). The actions are preferably commanded in the joint frame or end effector frame, but can be commanded in the origin frame, the camera frame, and/or any other suitable frame. The actions can define a target state of a robot component (e.g., joint state, end effector pose, etc.); a change in the commanded robot parameter (e.g., joint state, end effector pose); define a rate of change and change duration; and/or any other suitable pose parameter or derivative thereof. Examples of the actions can include: desired deltas of the joint states (e.g., $a_t$), which are used to determine the joint states $j_t$ (e.g., directly); desired transformations of the end-effector pose (e.g., $A_t$), which are used to determine the end-effector pose $P_t$ using the kinematics model; and/or any other actions. However, the actions can be otherwise determined.

The sub-models can include: a camera sub-model, a structural sub-model, a kinematics sub-model, and/or any other suitable sub-model. The sub-models can be untrained (e.g., without values for the model parameters), pre-trained (e.g., with model parameters initialized to previously determined values), or otherwise initialized. Each sub-model is preferably modular, and represents a different physical component of the system (e.g., camera, structure, kinematics, etc.). Alternatively, the generative model can be unitary or otherwise configured.

The camera sub-model preferably includes the camera parameters that relate the feature pose to the feature pixel locations. The camera sub-model preferably relates the feature pose to feature pixel locations from multiple images, sampled by multiple cameras, but can alternatively relate the feature pose to the feature pixel locations from a single camera. The feature pixel locations can be extracted from the respective camera's image (e.g., using the feature detector).

The camera sub-model can project the feature points onto the image using a pinhole camera model. The pinhole camera model uses extrinsics parameters that are derived from the camera's pose relative to the robot and intrinsics parameters that define how the 3D points in the camera frame are projected onto the image plane at particular pixels. The extrinsic parameters define a rigid transformation that is the inverse of the camera pose in the origin frame.

The extrinsics parameters is parameterized by camera rotation R (e.g., different from collective kinematics parameter R) and translation t which define a 6D camera pose:

$$E = \begin{bmatrix} R & t \\ 0 & 1 \end{bmatrix}$$

The intrinsics parameters are defined by focal length in x and y (e.g., $f_x$; $f_y$) and the principal point in x and y (e.g., $p_x$, $p_y$):

$$K = \begin{bmatrix} f_x & 0 & p_x & 0 \\ 0 & f_y & p_y & 0 \\ 0 & 0 & 1 & 0 \end{bmatrix}$$

Additional distortion parameters can be included in the intrinsics matrix.

However, the intrinsics and extrinsics parameters can be otherwise defined.

The 3D coordinates of m feature in the origin frame are collected into the matrix M (e.g., feature pose). The projection of those points to pixel locations is as follows:

$$C_{K,E}(M_t) = KE \begin{bmatrix} M_{t1x} & M_{t1y} & M_{t1z} & 1 \\ M_{t2x} & M_{t2y} & M_{t2z} & 1 \\ \vdots & \vdots & \vdots & \vdots \\ M_{tmx} & M_{tmy} & M_{tmz} & 1 \end{bmatrix}^T$$

In variants that utilize multiple cameras, multiple different intrinsics and extrinsics parameters are determined for each camera. The intrinsics and extrinsics parameters for a single camera can be represented by V. There are $V_1, \ldots, V_c$ parameters for c different cameras. However, the camera sub-model can be otherwise configured.

The structural sub-model preferably includes the structure parameters that relate the pose of the end effector to the feature pose. The structural model can be used to determine the feature pose in the origin frame. The structural model can track visual features in images. The visual features can be parameterized by their 3D coordinates defined in the end-effector frame. The 3D coordinates for m feature points can be collected into the matrix F. Given the end-effector pose, the coordinates of the visual features points in the origin frame can be computed as follows:

$$S_F(P_t) = P_t \begin{bmatrix} F_{1x} & F_{1y} & F_{1z} & 1 \\ F_{2x} & F_{2y} & F_{2z} & 1 \\ \vdots & \vdots & \vdots & \vdots \\ F_{mx} & F_{my} & F_{mz} & 1 \end{bmatrix}^T$$

In a first variant, when the visual feature is attached to the end-effector, $P_t$ is the Cartesian pose of the end-effector.

In a second variant, when the visual feature is attached to a robot joint, $P_t$ is the Cartesian pose of that joint and F includes the relative coordinates in that joint's reference frame.

However, the structural sub-model can be otherwise configured.

The kinematics sub-model preferably includes the kinematics parameters that relate the joint states to the end effector pose. The kinematics sub-model is optional, and can be used when joint states are determinable (e.g., when a joint state controller is used). The kinematics parameters are preferably specific to a particular robot, but can additionally or alternatively be re-used for robots of the same type or learned based on kinematics parameters from a robot of the same type. The kinematics parameters can be dependent on the robot's link lengths, rotation of the joints, relative transformation between the joints, and/or any other information. Alternatively, the kinematics parameters can be represented using other kinematics models and/or conventions. The kinematics sub-module can be used to determine the Cartesian pose of the end-effector in the origin frame and/or base frame.

In a first variant, the Cartesian pose can be determined using the kinematics sub-model as follows:

$$K_{B,\omega,d,a,\alpha}(j_t) = B \prod_{i=1}^{n} T_{\omega_i,d_i,a_i,\alpha_i}(j_t[i])$$

The kinematics parameters are determined using the Denavit-Hartenberg convention. For each joint there are 4 DH parameters: ω, which is associated with joint angle offset, d, which is associated with link offset, a, which is associated with link length, α, which is associated with link twist. Additionally, the kinematics sub-model includes the parameter B, which is the base frame parameter (e.g., 6D pose transformation for the end-effector). The parameters and the joint state define the following transformation:

$$T_{\omega,d,a,\alpha}(j) = \begin{bmatrix} \cos(\omega + j) & -\sin(\omega + j)\cos\alpha & \sin(\omega + j)\sin\alpha & a\cos(\omega + j) \\ \sin(\omega + j) & \cos(\omega + j)\cos\alpha & -\cos(\omega + j)\sin\alpha & a\sin(\omega + j) \\ 0 & \sin\alpha & \cos\alpha & d \\ 0 & 0 & 0 & 1 \end{bmatrix}$$

Determining the Cartesian pose of the end effector includes composing the transformations for all joints of the robot. The kinematics parameters and the base frame parameter (e.g., ω, d, a, a) are collectively referred to as R. However, the kinematics sub-model can be otherwise configured.

In a first variant of the generative model, the joint states $j_t$ are observed. The kinematics model can determine the Cartesian pose of the end-effector, $P_t$, in the origin frame based on the joint states. The structural sub-model can determine the feature pose, $M_t$, based on the end-effector pose. The camera sub-model can project the feature pose onto camera i (e.g., defined by $V_i$) to determine feature pixel locations $I_{ti}$. In a specific example, for an n degree of freedom robot with m tracked features, observed in c cameras, the number of parameters of the generative model is: 6 from the robot base frame, 4n for the kinematics parameters, 3m for the structure parameters, 6c for the extrinsics parameters for c cameras, and 4c for the intrinsics parameters for c cameras.

However, the generative model can be otherwise configured.

5.2 Training the Generative Model S200.

Training the generative model S200 can function to determine parameter values for each of the sub-models of the generative model. The generative model can be trained with limited training data samples (e.g., less than 100, less than 200, less than 300, less than 500, less than 1000, more than 1000, etc.). The generative model can be trained within 1 hour, 10 minutes, 1 minute, and/or in any other suitable amount of time.

Figure 4:
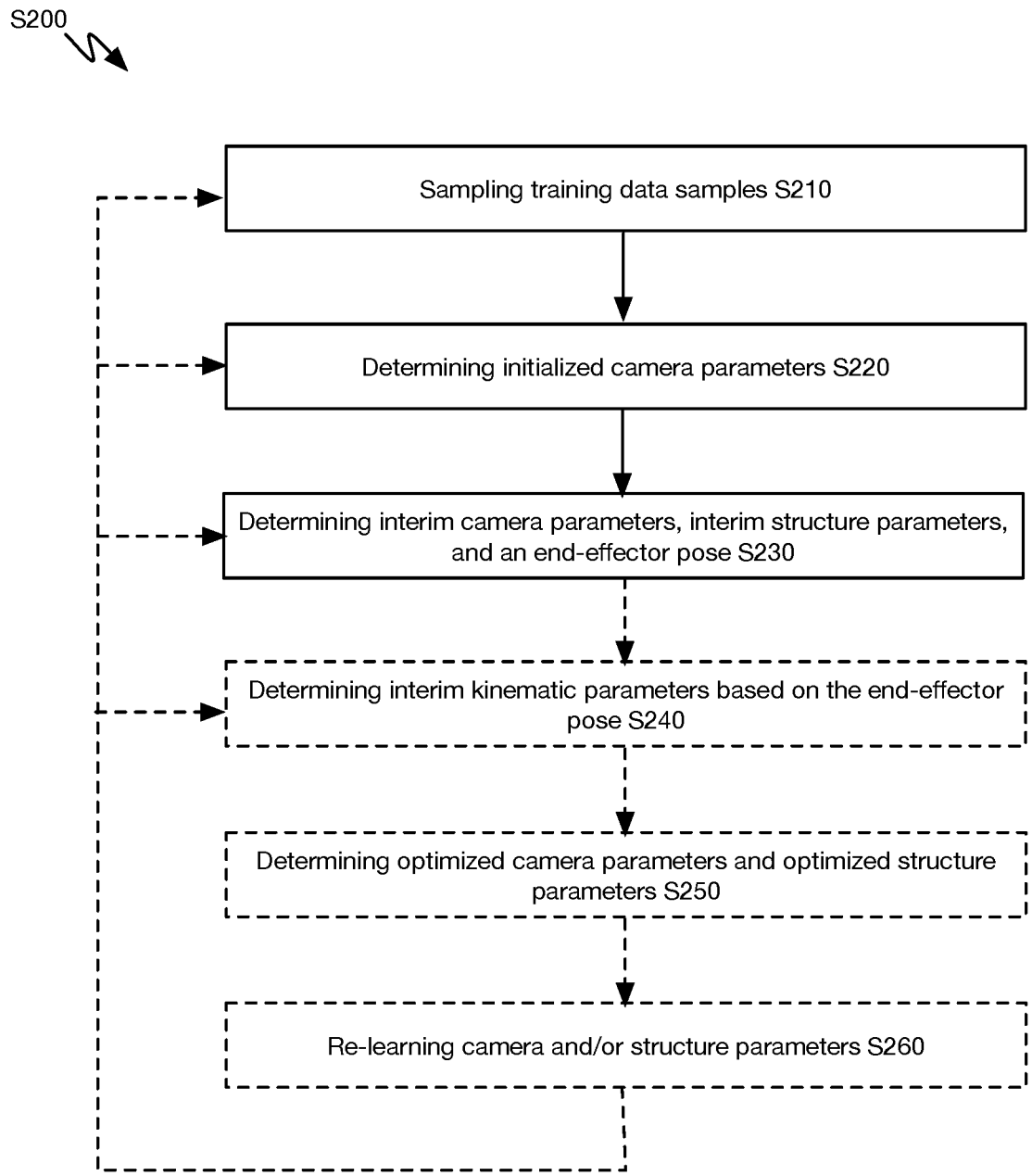
FIG. 4 depicts a schematic representation of S200.

Training the generative model S200 can include: sampling training data samples S210; optionally determining initialized camera parameters S220; determining interim camera parameters, interim structure parameters, and an end-effector pose S230; optionally determining interim kinematics parameters based on the end-effector pose S240; determining optimized camera parameters and optimized structure parameters S250; optionally re-learning camera and/or structure parameters S260; and/or any other suitable elements (e.g., as depicted in FIG. 4).

Sampling training data samples S210 can function to generate training data samples. Training data samples can be sampled before or after S220. Training data samples can be sampled before robot deployment into the field, during robot operation in the field (e.g., data collected during deployment or inference), or at any other suitable time. The training data samples can include an image, an action, and/or any other information. The action (e.g., commands, control instructions, etc.) can be a joint state, an end-effector Cartesian pose, end-effector transformation, and/or any other suitable action. The action can be determined randomly, quasi-randomly (e.g., using a low-discrepancy sequence), predetermined, according to a set of rules (e.g., select one command of each type), and/or otherwise determined. The image is preferably of the scene after control instruction execution (e.g., an image of the next timestep), but can alternatively be an image of the scene before or during control instruction execution. The training data samples preferably includes a time series of action-image pairs, but can additionally or alternatively include singular action-image pairs, a time-series of images, a timeseries of actions, or be otherwise constructed. A training data sample can be data for a single timestep, or data from multiple timesteps. An image is preferably paired with an action from the prior timestep, but can alternatively be paired with an action from the current timestep. The training data samples preferably includes data from at least two timesteps (e.g., 2, 5, 10, 100, 1000, timesteps, etc.), but can alternatively include a data from a single timestep. In an example, S210 can include iteratively: determining a command (e.g., action) at a first time, controlling the robot to execute the action, and sampling an image of the resultant scene at a second time. The scene can exclude or include calibration features (e.g., boards, etc.) during training data sampling. However, the training data samples can be otherwise determined.

Determining initialized camera parameters S220 can function to determine an estimate of a camera pose (e.g., in origin frame), an estimate of the end-effector (e.g., relative or absolute) at each timestep (e.g., when images from S210 are used), and/or provide any other suitable function. The initialized camera parameters are preferably determined by the processing system, but can be additionally or alternatively determined by any other suitable system. The camera parameters can be initialized before, during, or after S210, before S230, and/or at any other suitable time. The camera parameters can be initialized using the training data samples determined from S210, using different images sampled by the set of cameras, using factory parameters (e.g., factory intrinsic calibrations), and/or using any other suitable images.

In a first variant, the camera parameters for a single camera can be initialized using structure from motion (e.g., fixed camera and moving robot). The structure from motion algorithm determines the structure of the robot and the poses of the centroid of that robot at each timestep, which is used to determine the rigid transform of the end-effector pose. The structure from motion algorithm applies an incremental structure from motion procedure that chooses a pair of images that has feature correspondences, estimates the camera baseline, and triangulates the features to 3D (e.g., in the origin or base frame). New images that observe the already triangulated features can be sequentially added. When a new feature is observed by two images, the method can triangulate the new feature and add it to the model of the robot's structure.

In a second variant, the camera parameters for multiple cameras can be initialized using triangulation. The triangulation process can determine the poses of the cameras (e.g., extrinsic parameters for each camera), the pose of the end-effector at each timestep, and/or any other information. The triangulation process can include observing one or more of the same visual features in multiple cameras across multiple timesteps, determining a fundamental matrix between cameras using the observed visual features, determining an essential matrix using the fundamental matrix and an estimate of the intrinsic parameters (e.g., provided by a manufacturing facility, predetermined, etc.), and determining a transformation between two cameras based on the essential matrix. This procedure can be repeated for pairs of cameras that observe the same feature until all cameras are accounted for. Using the above estimate of the poses of the cameras, the system can triangulate all of the visual features observed in the multiple cameras to 3D, such that at each timestep, the system knows the 3D coordinates of each observed visual feature. The system can estimate the optimal (e.g., in terms of least square error) rigid transformation between the feature coordinates between two timesteps (e.g., at least 2 of the same features triangulated, at least 3, at least 4, at least 5, etc.). The optimal rigid transformation can be determined by taking the vector between the centroids of the coordinates as the translation and then performing an SVD to recover the rotation. The process can be repeated for pairs of timesteps that share at least 3 triangulated features until all valid timesteps (e.g., timesteps can be ignored if there are not sufficiently many triangulated visual features, such as more than 2, more than 3, etc.) are accounted for.

When the tracked visual features are rigidly attached to the end-effector, the transformations between the visual features in 3D at two timesteps is equivalent to the transformation of the end-effector pose between those two timesteps. The transformations can be composed across timesteps to recover an estimate of the end-effector Cartesian pose at each timestep. However, the initial camera parameters can be determined using any other suitable position calculation method.

In a third variant, the initialized camera parameters can be determined from a prior camera calibration (e.g., intrinsic parameters, extrinsic parameters, etc.).

However, the initialized camera parameters can be otherwise determined.

The method (e.g., S220) can optionally include initializing the structure parameters, the kinematics parameters, or other model parameters. The model parameters can be initialized using known system parameters, initialized using a calibration method, initialized randomly, or otherwise initialized. Known system parameters can be determined: manually, automatically (e.g., using feature detectors, geometric feature matching, extracted from manufacturer specifications, etc.), or otherwise determined. In a first example, the structure parameters can be initialized based on a known relationship between the end effector and the feature (e.g., known feature position on the end effector). In a second example, the kinematics parameters can be initialized based on: known: arm configurations, joint types (e.g., associated with known joint capabilities), link lengths, link numbers, link connections, link offsets, link twists, and/or other arm parameters; initialized using another calibration method, or otherwise initialized.

Determining interim camera parameters, interim structure parameters, and an end-effector pose S230 can function to learn intermediate parameter values that can be used to determine the optimized parameters in S250 (e.g., used to initialize the model that is optimized in S250). In some variants, the interim camera parameters and interim structure parameters can be treated as the optimized camera parameters and optimized structure parameters, respectively (e.g., when the generative model lacks other sub-models; example shown in FIG. 9). The interim camera parameters, interim structure parameters, and an end-effector pose can be determined concurrently (e.g., in a single step, single optimization, single bundle adjustment, etc.), separately (e.g., individually), or otherwise determined.

S230 can learn interim camera parameters for each camera, $V_{1:c}$, for c cameras, wherein V represents the intrinsics and extrinsics parameters for each camera. S230 can optionally determine the feature positions in the origin frame, Mr. The intrinsics and extrinsics parameters can be learned based on the initialized intrinsics and extrinsics parameters determined in S220. S230 can learn the interim structure parameters, F, and the end-effector pose, $P_t$. The interim parameters and the end-effector pose can be learned based on the feature pixel locations extracted from the images, the camera sub-model, the structural sub-model, and/or any other information or transformation.

Figure 8:
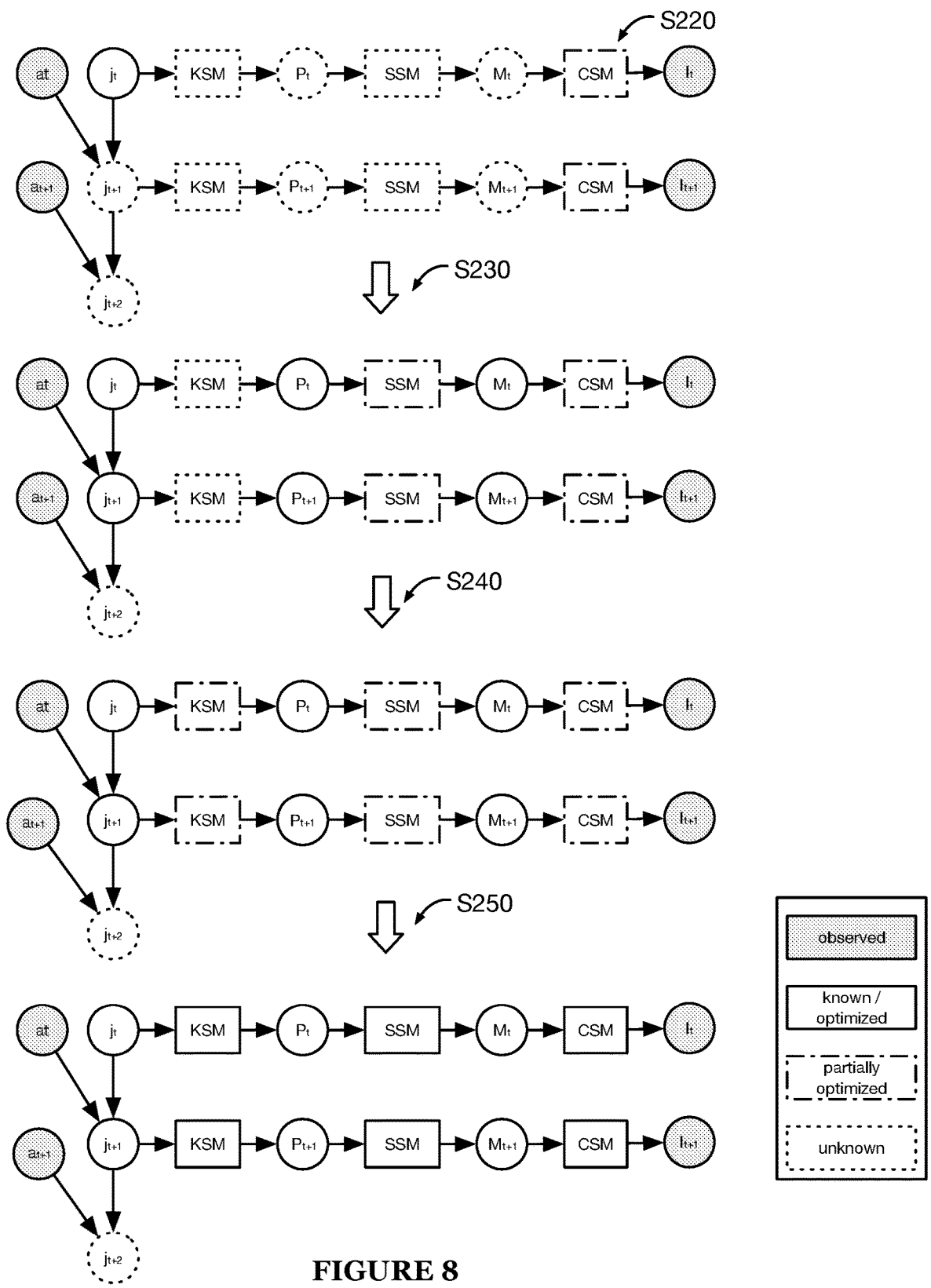
FIG. 8 depicts training a first variant of the generative model.
Figure 9:
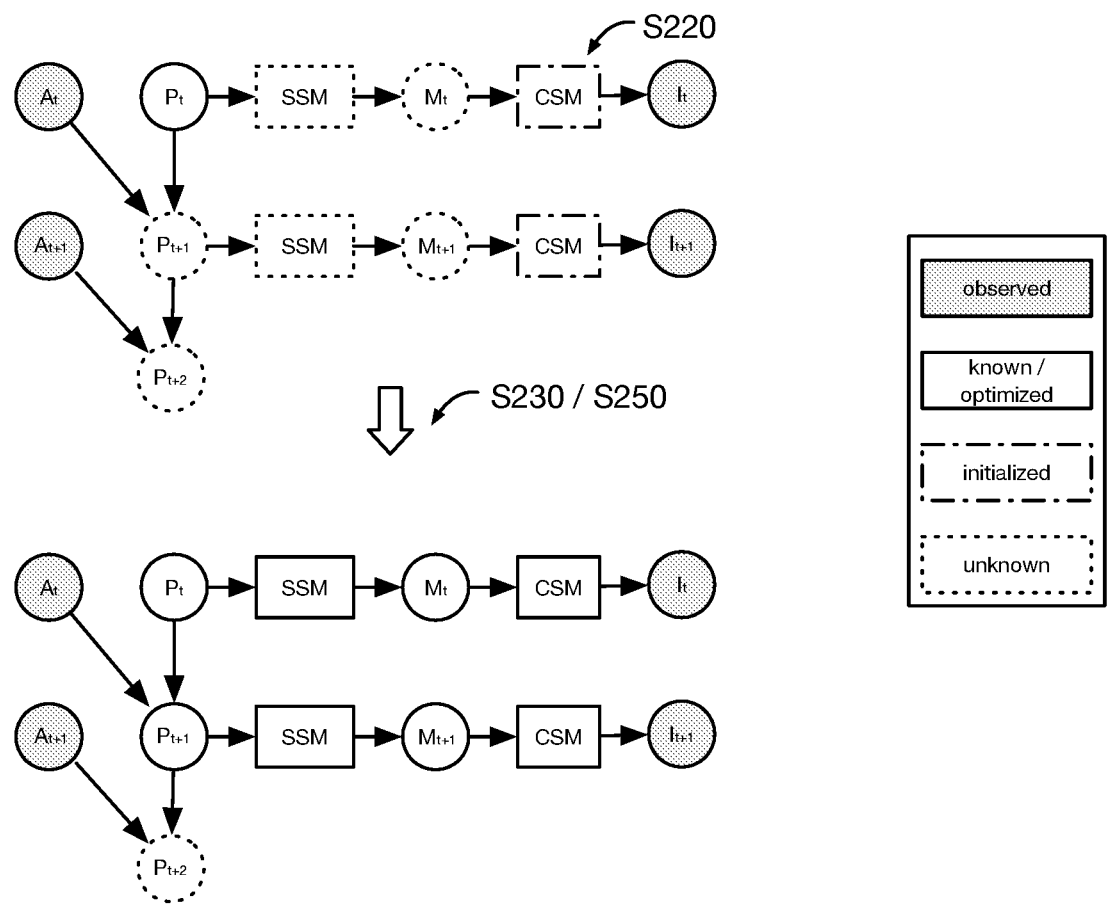
FIG. 9 depicts training a second variant of the generative model.

In a first variant, S230 can be performed by initializing the camera sub-model (e.g., using the parameter values from S220, randomly, etc.; examples shown in FIG. 8 and FIG. 9), initializing the structure sub-model (e.g., randomly, using parameter values from S220, etc.), and simultaneously optimizing the interim camera parameters, interim structure parameters (e.g., features' relative 3D coordinates), and the end-effector pose by minimizing the reprojection error, defined by the following loss function:

$$L_{cam}(P_{1:T}, F, V_{1:c}, I_{1:T}) = \sum_{t=1}^{T}\sum_{i=1}^{c} D_{pixel}(C_V(S_F(P_t)), I_{ti}) \quad (2)$$

$$P_{1:T}^*, F^*, V_{1:c}^* = \underset{P_{1:T}, F, V_{1:c}}{\operatorname{argmin}}\, L_{cam}(P_{1:T}, F, V_{1:c}, I_{1:T}^o) \quad (3)$$

The loss function is calculated for c cameras and T timesteps. $P_{1:T}$ are the transformation matrices of the end-effector's pose at each timestep. $I_{ti}$ contains the pixel coordinates of the features in camera i at time t. The loss in Eq (2) is the error between the pixel coordinates contained in $I_{1:T}$ and the pixel coordinates generated from poses $P_{1:T}$. The function $D_{pixel}(C_V(S_F(P_t)), I_{ti})$ is a quadratic error between the generated and actual pixel coordinates, which is computed only over the features that are observed in the image from the training data sample. $D_{pixel}$ can additionally or alternatively be a Frobenius norm, a L1 norm, L2 norm, quaternion error, and/or any other suitable comparison. In optimization of Eq. (3), the superscript o on $I^o_{1:T}$ indicates that these pixel locations are observed and the observed values are used in the Eq. (3) optimization.

Alternatively, the end effector pose can be determined based on a prior end effector pose (e.g., from a prior timestep) and a commanded action from the prior timestep. For example, when the action defines a commanded change in the end effector pose, the end effector pose for the current timestep can be calculated by transforming the prior end effector pose with the commanded change.

However, the interim camera parameters, interim structure parameters, and an end-effector pose can be otherwise determined.

Determining interim kinematics parameters based on the end-effector pose S240 can function to determine kinematic parameters based on the output of S230 (example shown in FIG. 8). S240 is optionally performed when the actions include joint state commands. When the actions include target component changes, the interim kinematics parameters can be excluded. The interim kinematics parameters, R, include n sets of DH parameters as described above.

In a first variant, the interim kinematics parameters can be determined based on actions (e.g., directly observed joint states, joint states can be determined based on the action when the action is a delta or transformation, etc.) and the end-effector pose from S230. The values for R can be initialized randomly, based on known parameters (e.g., link length, number of links, etc.), and/or otherwise initialized. The kinematics parameters can be determined by minimizing the following loss function:

$$L_{kin}(R, j_{1:T}, P_{1:T}) = \sum_{t=1}^{T} D_{pose}(K_R(j_t), P_t) \quad (4)$$

$$R^* = \underset{R}{\operatorname{argmin}}\, L_{kin}(R, j_{1:T}^o, P_{1:T}^o) \quad (5)$$

Wherein in Eq. (4), $D_{pose}(K_R(j_t), P_t)$ is the Frobenius norm corresponding to the generated and actual end-effector Cartesian pose, respectively. $D_{pose}$ can additionally or alternatively be the L1 norm, L2 norm, quaternion error, quadratic error, and/or any other suitable comparison. In Eq. (5), $P^o_{1:T}$ is set equal to $P^*_{1:T}$ from S230 (e.g., not directly observed) and $j^o_{1:T}$ indicates that the joint states are observed (e.g., provided by a user).

In a second variant, the interim kinematics parameters can be calculated based on known robot parameters (e.g., joint angle offset, link offset, link length, link twist, etc.).

However, the interim kinematics parameters can be otherwise determined.

Determining optimized camera parameters and optimized structure parameters S250 can function to determine final parameters that improve the accuracy of the generative model. The optimized camera parameters and optimized structure parameters are preferably optimized simultaneously. S250 can additionally or alternatively include calculating optimized kinematics parameters (e.g., when the actions include joint state commands). The optimized kinematics parameters can be optimized simultaneously with the optimized camera parameters and the optimized structure parameters, and/or optimized after.

When the model excludes the kinematics sub-model (e.g., when a cartesian controller is used), S250 can be the same as S230 (e.g., be the same step, wherein the optimized camera and structural parameters are determined in S230), S250 can be excluded, or be a second optimization step.

In a first variant, the optimized camera parameters, optimized structure parameters, and optimized kinematics parameters can be determined based on the joint states and the feature pixel locations, and/or any other suitable information from the joint controller.

In this variant, the model parameters can be determined by minimizing the following loss function (e.g., assuming noiseless joint states):

$$L_{e2e}(R, F, V_{1:c}, j_{1:T}, I_{1:T}) = \sum_{t=1}^{T}\sum_{i=1}^{c} D_{pixel}(C_{V_i}(S_F(K_R(j_t))), I_{ti}) \quad (6)$$

$$R^f, F^f, V^f_{1:c} = \underset{R,F,V_{1:c}}{\operatorname{argmin}}\, L_{e2e}(R, F, V_{1:c}, j^o_{1:T}, I^o_{1:T}) \quad (7)$$

The loss function is calculated for c cameras and T timesteps. The function in Eq. (4), $D_{pixel}(C_{Vi}(S_F(K_R(j_t))), I_{ti})$, can be the Frobenius norm, the quadratic error, L1 norm, L2 norm, quaternion error, and/or any other suitable comparison. The loss in Eq. (6) is the error between the pixel coordinates in $I_{1:T}$ and the pixel coordinates generated through our full model from the joint states $j_{1:T}$ through the full generative model. The superscript f in Eq. (7) denotes that these are the final settings of each of the optimized kinematics parameters, optimized structure parameters, and optimized camera parameters respectively. In Eq. (7), the joint states $j^o_{1:T}$ and images $I^o_{1:T}$ are observed. In Eq. (7), F, $V_{1:c}$ are initialized to be the F* and $V^*_{1:c}$ output from S230 and R is initialized to be R* from S240.

The loss function(s) discussed above can optionally be extended with an additional term that penalizes the learned state for the component of interest based on deviation away from an observed state for the component of interest. The additional term can be added, subtracted, a multiplier, or otherwise applied. This can be used for noisy states (e.g., noisy joint states, noisy end effector pose, etc.), noisy actions, noisy images, or otherwise used. The component of interest can be the joint, the end effector, or another component. The state can be a set of states (e.g., for multiple components; a joint state), a pose (e.g., end effector pose), or otherwise characterize the component of interest.

The loss function that is extended can be dependent on the controller type (e.g., joint vs. cartesian), the commanded action type, where noise manifests, and/or otherwise determined. For example, the camera loss function (Eq (2)) can be extended with the additional term when a noisy cartesian controller is used, and the end-to-end loss function (Eq (6)) can be extended with the additional term when a joint controller is used.

The additional term can include: a loss weight ($\lambda$) can be a weight (e.g., associated with observed state accuracy, associated with noise, associated with trust, etc.), an error term for each learned-observed component state pair (D), the learned component state (e.g., for the current or next timestep), the observed component state (e.g., for the current timestep), the commanded action (e.g., from the current or prior timestep), and/or any other suitable parameter.

In a first variant, the joint states are noisy and the parameters can be determined by minimizing the following loss function:

$$L_{noisyjoint}(j_{1:T}, j^o_{1:T}, R, F, V_{1:c}, I_{1:T}) = \qquad (10)$$

$$L_{e2e}(R, F, V_{1:c}, j_{1:T}, I_{1:T}) + \lambda \sum_{i=1}^{T} D_{joint}(j_t, j^o_t)$$

$$j^*_{1:T}, R^*, F^*, V^*_{1:c} = \underset{j_{1:T}, R, F, V_{1:c}}{\mathrm{argmin}} \, L_{noisyjoint}(j_{1:T}, j^o_{1:T}, R, F, V_{1:c}, I^o_{1:T}) \qquad (11)$$

The loss function in Eq. (10) extends the end-to-end loss in Eq. (6). The additional term in Eq. (6):

$$\lambda \sum_{i=1}^{T} D_{joint}(j_t, j^o_t)$$

penalizes the learned joint states differing from the observed joint states using the function $D_{joint}(j_t, j^o_t)$, which can be a Frobenius norm, a quadratic error, L1 norm, L2 norm, quaternion error, and/or any other suitable comparison. In Eq. (10) and Eq. (11), $j^o_t$ is the noisy estimate of the joint states that the system observes. In Eq. (10), $\lambda$ is a weight that captures the noisiness of the joint state estimates.

In a second variant, the optimized camera parameters, optimized structure parameters, and optimized kinematics parameters can be determined based on noisy actions received at a noisy joint controller. The actions are preferably desired deltas of joint angles for the robot. The parameters can be determined by minimizing the following loss function:

$$L_{jointaction}(j_{1:T}, R, F, V_{1:c}, I_{1:T}, \hat{a}_{1:T}) = \qquad (14)$$

$$L_{e2e}(R, F, V_{1:c}, j_{1:T}, I_{1:T}) + \lambda \sum_{t=1}^{T-1} D_{joint}(j_{t+1} - j_t, \hat{a}_t)$$

$$j^*_{1:T}, R^*, F^*, V^*_{1:c} = \underset{j_{1:T}, R, F, V_{1:c}}{\mathrm{argmin}} \, L_{noisyjoint}(j_{1:T}, R, F, V_{1:c}, I^o_{1:T}, a^o_{1:T}) \qquad (15)$$

The loss function in Eq. (14) extends the end-to-end loss in Eq. (6). The additional term in Eq. (14):

$$\lambda \sum_{t=1}^{T-1} D_{joint}(j_{t+1} - j_t, \hat{a}_t)$$

penalizes consecutive joint states differing from the commanded delta of the joint states, $a_t$, at that timestep. The function $D_{joint}$ can be the Frobenius norm, a quadratic error, L1 norm, L2 norm, quaternion error, and/or any other suitable comparison. In Eq. (15), $a^o_{1:T}$ and $I^o_{1:T}$ are observed. In Eq. (14), $\lambda$ is a weight that captures the noisiness of the actions.

In a third variant, the optimized camera parameters, optimized structure parameters (excluding the optimized kinematics parameters), and the actual end-effector Cartesian pose can be determined based on the training data samples and the noisy cartesian pose observed by the system (e.g., in the training data samples). In this variant, the robot can be controlled using a Cartesian controller. The parameters can be determined by minimizing the following loss function:

$$L_{noisycart}(P_{1:T}, P^o_{1:T}, F, V_{1:c}, I_{1:T}) = \qquad (8)$$

$$L_{cam}(P_{1:T}, F, V_{1:c}, I_{1:T}) + \lambda \sum_{i=1}^{T} D_{pose}(P_t - P^o_t)$$

$$P^*_{1:T}, F^*, V^*_{1:c} = \underset{P_{1:T}, F, V_{1:c}}{\mathrm{argmin}} \, L_{noisycart}(P_{1:T}, P^o_{1:T}, F, V_{1:c}, I^o_{1:T}) \qquad (9)$$

Wherein $P_{1:T}$, F, and $V_{1:c}$ are the output of S220 and S230. In Eq. (8), the term:

$$\lambda \sum_{i=1}^{T} D_{pose}(P_t, P^o_t)$$

penalizes the learned pose from differing from the observed pose. The function $D_{pose}$ can be the Frobenius norm, a quadratic error, L1 norm, L2 norm, quaternion error, and/or any other suitable comparison. In Eq. (8), $P^o_{1:T}$ is the noisy estimate of the end-effector pose that the system observes. In Eq. (8), $P_{1:T}$ are the Cartesian poses that are learned by the system. In Eq. (8), $\lambda$ is a weight that represents the noisiness of the pose estimates from the actual end-effector pose. $\lambda$ can vary inversely proportionally with the variance of the noise in the observed end-effector pose.

In a fourth variant, the optimized camera parameters, optimized structure parameters (excluding the optimized kinematics parameters), and the actual end-effector Cartesian pose can be determined based on the training data samples and the actions received at a noisy Cartesian controller. The actions are preferably desired transformations of the end-effector. The parameters can be determined by minimizing the following loss function:

$$L_{cartaction}(P_{1:T}, F, V_{1:c}, I_{1:T}, A_{1:T}) = \qquad (12)$$
$$L_{cam}(P_{1:T}, F, V_{1:c}, I_{1:T}) + \lambda \sum_{t=1}^{T-1} D_{pose}(P_{t+1}P_t^{-1}, A_t)$$

$$P_{1:T}^*, F^*, V_{1:c}^* = \underset{P_{1:T}, F, V_{1:c}}{\operatorname{argmin}} L_{cartaction}(P_{1:T}, F, V_{1:c}, I_{1:T}^o, A_{1:T}^o) \qquad (13)$$

Wherein $P_{1:T}$, F, and $V_{1:c}$ are the output of S220 and S230. In Eq. (12), the additional term:

$$\lambda \sum_{t=1}^{T-1} D_{pose}(P_{t+1}P_t^{-1}, A_t)$$

penalizes consecutive end-effector poses differing from the commanded transformation $A_t$ at that timestep. In Eq. (13), actions $A^o_{1:T}$ and pixel coordinates $I^o_{1:T}$ are observed by the system. In Eq. (13), λ is a weight that represents the nosiness of the Cartesian controller.

However, the optimized camera parameters and optimized structure parameters can be otherwise determined.

Figure 12:
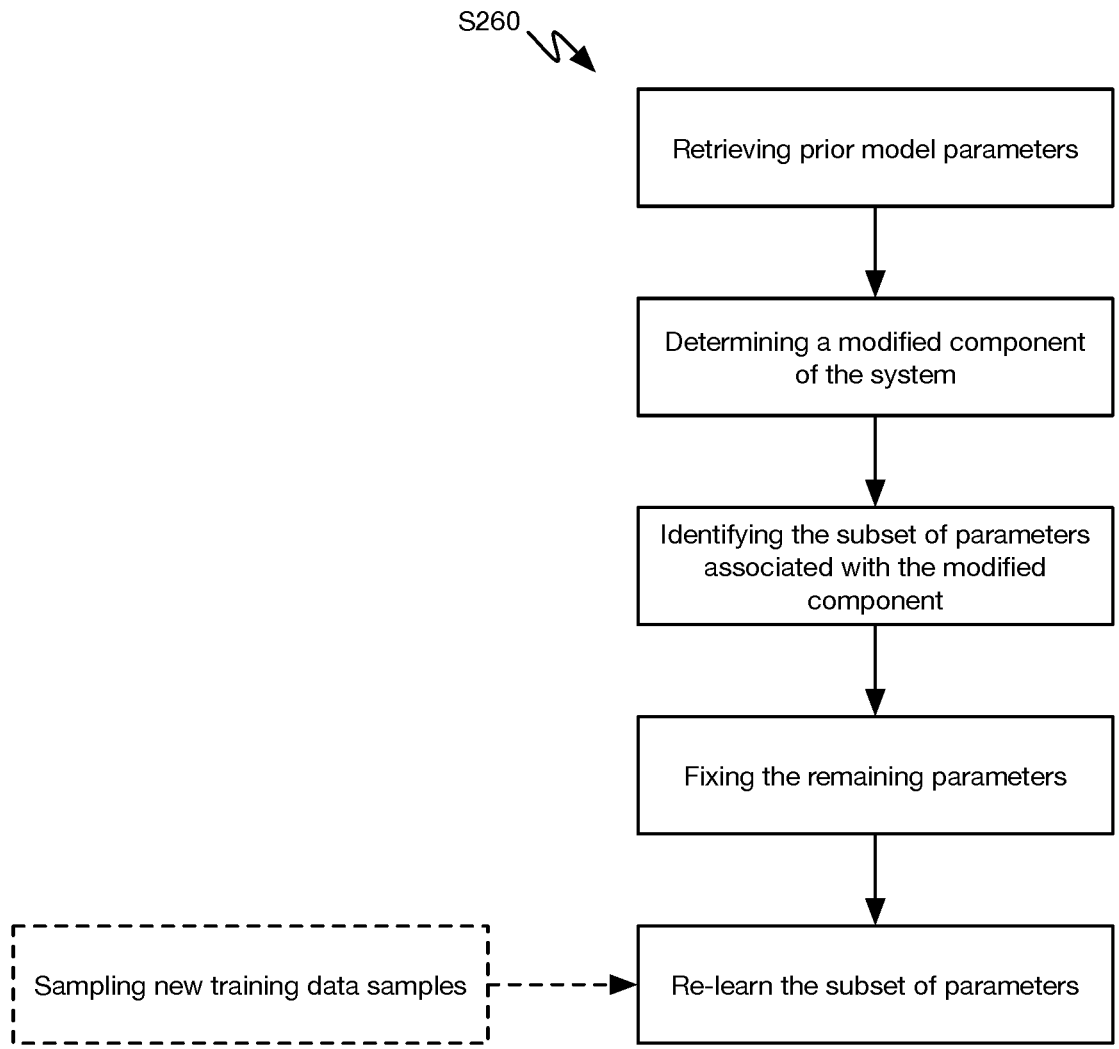
FIG. 12 depicts an embodiment of S260.

Re-learning camera and/or structure parameters S260 can function to re-learn a subset of the parameters in response to a change in the system after training the generative model, such as by sampling a new set of images and re-training the generative model while the parameters associated with the remaining system components remain fixed (e.g., depicted in FIG. 12). S260 can additionally or alternatively include re-learning the kinematics parameters (e.g., when there are changes to the robot).

In a first variation, S260 can be performed by varying the parameters of the sub-model associated with the changed component and fixing the parameters of the remaining sub-models. For example, S260 can include: retrieving prior model parameters (e.g., optimized model parameters); determining a modified component of the system; identifying the subset of parameters associated with the modified component; fixing the remaining parameter values from the prior model; sampling new training data; and re-learning the subset of parameters using one or more of the steps discussed above, using the new training data.

In a first example, S260 can be applied after re-placing the visual features with new visual features and re-learning the structure parameters (e.g., using S230 and S250).

In a second example, S260 can be applied after adding or subtracting cameras from the set of cameras and re-learning the camera parameters (e.g., using S230 and S25o).

In a third example, S260 can be applied after changing the robot joints, linkages, or other configuration parameters and re-learning the kinematics parameters (e.g., using S240 and S250).

In a fourth example, S260 can be applied if the robot is not fixed to the ground and/or when motions executed by the robot cause the robot base to shift. S260 can be applied if a new end-effector is installed, if there are changes to the force-torque sensors, and/or any other modifications to the robot.

Examples of parameter subsets that are associated with specific system components include: camera parameters for camera changes; structural parameters for feature, end effector, or arm construction changes; kinematic parameters for arm construction changes; and/or any other suitable set of parameters for any other suitable set of components.

In a first example, when there is a change to the cameras, the camera parameters can be allowed to vary and the structural, and optionally the kinematics, parameters can be fixed.

In a second example, when there is a change to the end-effector, the structural parameters can be allowed to vary and the camera and optionally the kinematics parameters can be fixed.

In a third example, when the robot changes, the kinematics parameters can be allowed to vary and optionally the structural parameters and the camera parameters can be fixed.

In a second variation, S260 can include periodically performing S230 to S250 (and/or portions thereof) during operation, wherein runtime data (e.g., images and actions determined during robot operation using the trained model) can be used as training data. This variant can be executed: periodically (e.g., every N commands, every M minutes, etc.), iteratively, in response to satisfaction of a condition (e.g., a threshold number, proportion, or rate of failed grasps or insertions is met), and/or at any other suitable time.

The parameters that are allowed to vary can be initialized to prior parameter values, randomly initialized, and/or otherwise initialized.

However, the generative model can be otherwise trained.

5.3 Controlling the Robot Using the Trained Generative Model S300.

Figure 5:
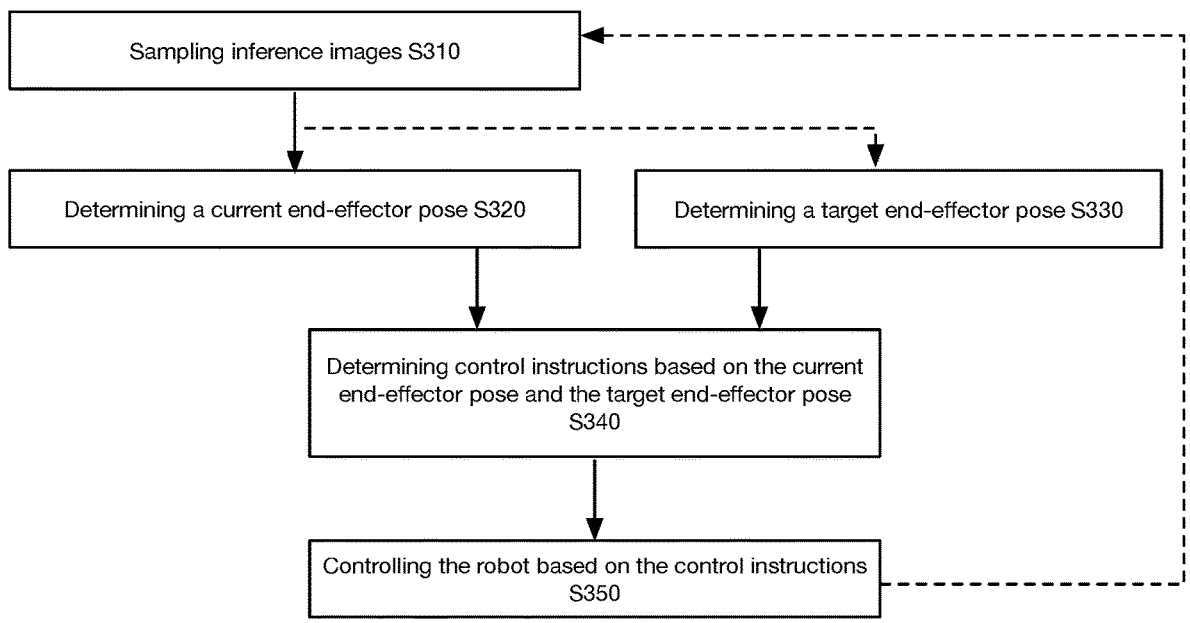
FIG. 5 depicts a schematic representation of S300.

Controlling the robot using the trained generative model S300 can function to efficiently and accurately control the robot using the trained generative model and visual feedback. Specifically, given target locations of the visual features in the image, the system can command the robot to match those targets. S300 is preferably performed after S200, but can additionally or alternatively be performed at any other suitable time. Controlling the robot can include: sampling inference images S310; determining a current end-effector pose S320; determining a target end-effector pose S330; determining control instructions based on the current end-effector pose and the target end-effector pose S340; controlling the robot based on the control instructions S350; and/or any other suitable elements (e.g., as depicted in FIG. 5).

Sampling inference images S310 can function to provide images for inference. S300 can be performed using one or more cameras. Preferably the system uses 2 cameras to perform inference, but the system can additionally or alternatively perform inference using 1 camera, 3 cameras, more than 3 cameras, the same cameras used to determine the training data samples, and/or any other suitable number of cameras. When the model is trained using 2 or more cameras, inference can be performed using a single camera, using 2 cameras, using more than 2 cameras, and/or any other suitable number of cameras. S310 can be performed using the processes described in S210. However, the inference images can be otherwise determined.

Figure 10:
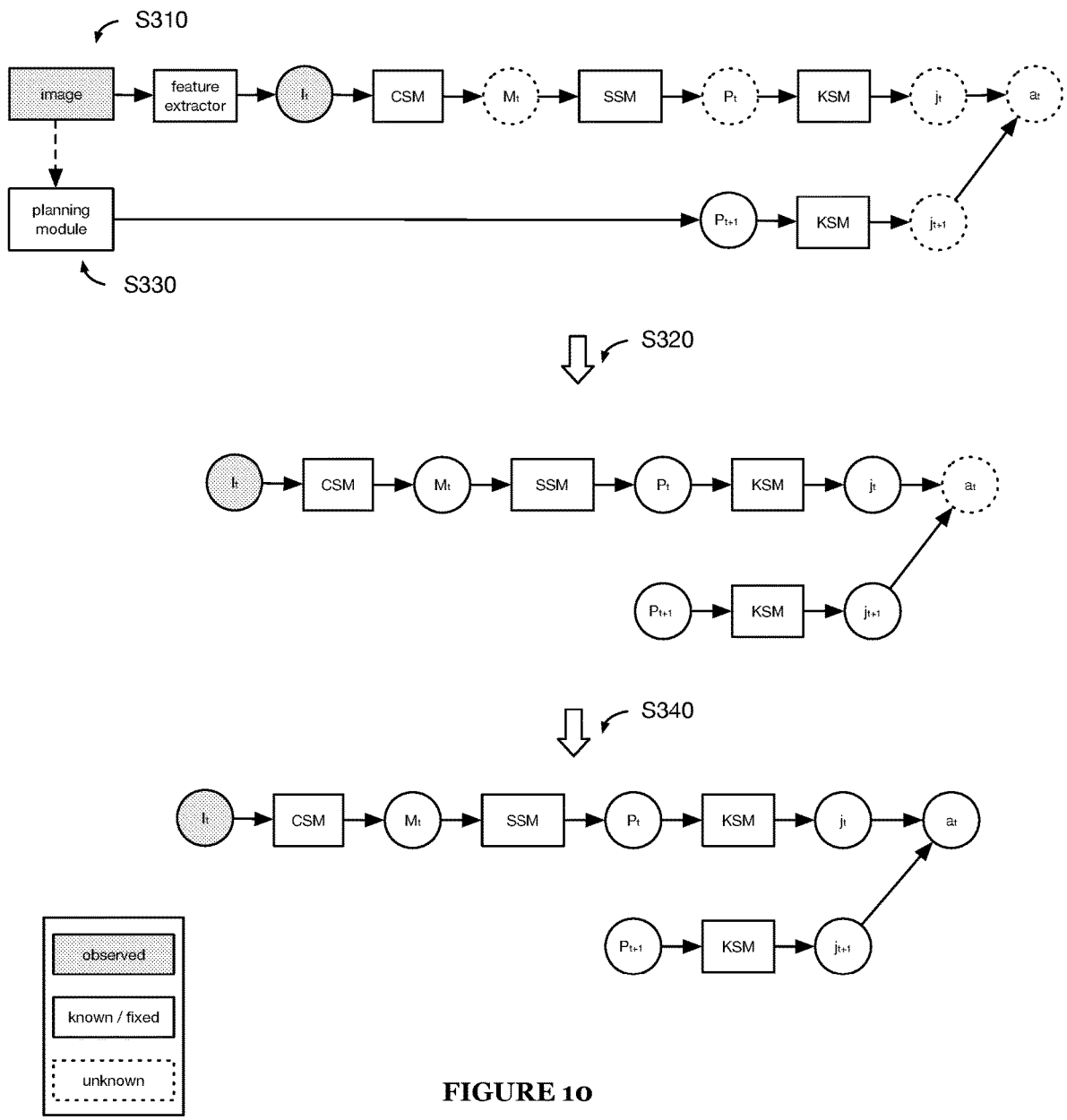
FIG. 10 depicts determining an action using a trained first variant of the model.
Figure 11:
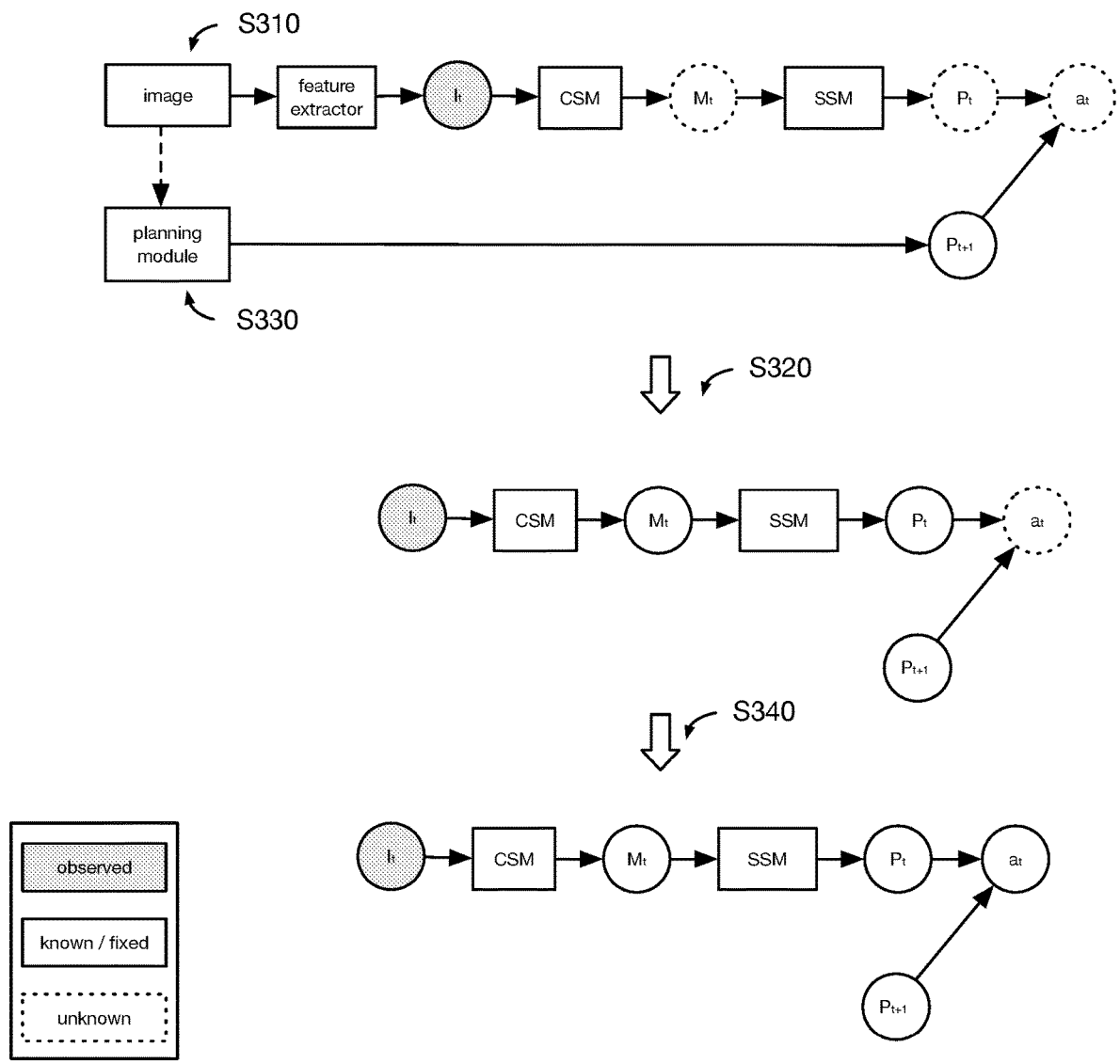
FIG. 11 depicts determining an action using a trained second variant of the model.

Determining a current end-effector pose S320 can function to determine the pose of the end-effector at the current timestep using the inference image from S310 and the learned (e.g., optimized) camera and structure parameters from S200 (examples shown in FIG. 10 and FIG. 11). Additionally or alternatively, S320 can include determining the current joint states based on the current end effector pose and the learned (e.g., optimized) kinematics parameters from S200 (example shown in FIG. 10). However, the current end-effector pose can be otherwise determined.

Determining a target end-effector pose S330 can function to determine the desired pose of the end-effector. The target end-effector pose is preferably a Cartesian pose, but can additionally or alternatively be any other suitable pose. The target end-effector pose is preferably determined for the next timestep, but can additionally or alternatively be determined for any suitable timestep (e.g., next 2 timesteps, next 5 timesteps, next 10 timesteps, etc.). The target end-effector pose can be received from a planning module, such as the insertion planner, the grasp planner, and/or any other component (example shown in FIG. 10 and FIG. 11). However, the target end-effector pose can be otherwise determined.

Determining control instructions based on the current end effector pose and the target end effector pose S340 can function to determine actions which can be used to control the robot. The control instructions (e.g., actions) can include: target joint states of the robot, target end effector pose, deltas (e.g., joint state change for the timestep, end effector pose change for the timestep), and/or any other suitable control instruction.

In a first variant, the control instructions can be determined by using the target component state (e.g., end effector pose, joint state)) and performing backward kinematics analysis using the generative model. The target component state can be treated as the component state for the next timestep, or otherwise treated.

In a second variant, the control instructions can be determined by inferring the delta between the current component state and the target component state (e.g., current and target end effector pose, respectively; current and target joint state, respectively), and determining the control instruction based on the delta (e.g., using the delta as the control instruction). However, the control instructions can be otherwise determined.

In a first example, when the actions are joint states of the robot, an inverse kinematics algorithm can be used to determine the robot transformation from the current end-effector pose to the target end-effector pose. One or more solutions from the inverse kinematics algorithm can be selected (e.g., randomly) and used as the control instructions.

In a second example, when the actions are desired deltas, and when the current end-effector pose is inferred incorrectly: visual features can be tracked on earlier links of the robot (e.g., joints before the end-effector) and/or the current end-effector pose can be determined based on a set of joint states that are most consistent with the previously taken actions.

However, the control instructions can be otherwise determined.

Controlling the robot based on the control instructions S350 can function to control the robot from the current end-effector pose to the target end-effector pose.

In a first variant, when the actions are joint states, the system can move the robot to the joint states inferred by the generative model (e.g., from S340).

In a second variant, when the actions are deltas, the system can move the robot using the deltas in joint or Cartesian space.

In a third variant, when the controller is noiseless, the system will move the end-effector to the target end-effector pose accurately in one motion.

In a fourth variant, when the controller is noisy, the procedure can be repeated multiple times until the end-effector is at the target end-effector pose.

Embodiments of the system and/or method can include every combination and permutation of the various system components and the various method processes, wherein one or more instances of the method and/or processes described herein can be performed asynchronously (e.g., sequentially), concurrently (e.g., in parallel), or in any other suitable order by and/or using one or more instances of the systems, elements, and/or entities described herein.

As a person skilled in the art will recognize from the previous detailed description and from the figures and claims, modifications and changes can be made to the preferred embodiments of the invention without departing from the scope of this invention defined in the following claims.

We claim:

1. A method for system control, wherein the system comprises an end-effector connected to a robot, comprising:
   determining a generative model comprising a set of variables and a set of parameters, wherein the set of variables comprises observed variables and hidden variables, wherein the observed variables are used to estimate hidden values for the hidden variables, and wherein the set of parameters comprises camera parameters and structure parameters;
   training the generative model, comprising:
      sampling a set of images, wherein each image depicts the robot, the end-effector, and a feature rigidly connected to the end effector;
      determining feature pixel locations of the feature detected in the set of images;
      initializing initial camera values for the camera parameters;
      determining an action for the robot, wherein the action is a an observed variable of the set of variables;
      calculating optimized camera values for the camera parameters, optimized structure values for the structure parameters, and a pose value for an end-effector pose based on the initialized camera values, the action, and the feature pixel locations, wherein the end-effector pose is a hidden variable of the set of variables; and
   controlling the robot using the trained generative model.

2. The method of claim 1, wherein the hidden variables further comprise a joint state, wherein the joint state is related to the end effector pose by kinematics parameters.

3. The method of claim 2, wherein training the generative model further comprises:
   calculating interim camera values for the camera parameters, interim structure values for the structure parameters, and an interim pose value for the end-effector pose based on the initial camera values, and the feature pixel locations, wherein the end-effector pose is a hidden variable of the set of variables;
   calculating interim kinematics values for kinematics parameters based on the interim pose value for the end-effector pose and the joint state; and
   wherein optimized kinematics values for the kinematics parameters are calculated simultaneously with the optimized camera values and the optimized structure values by optimizing the generative model, wherein the generative model is re-initialized with the interim camera parameters, the interim structure parameters, and the interim kinematics parameters.

4. The method of claim 3, wherein the action is used to derive the joint state.

5. The method of claim 1, wherein the robot is controlled using a cartesian controller and wherein controlling the robot comprises sending inference actions to the robot, wherein the inference actions are target transformations of the end-effector.

6. The method of claim 1, wherein the robot is controlled using a joint controller and wherein controlling the robot comprises sending inference actions to the robot, wherein the inference actions comprise a target joint change of a joint angle for a joint of the robot.

7. The method of claim 1, wherein controlling the robot comprises sending a target joint state for a joint of the robot to the robot.

8. The method of claim 1, wherein when a current joint state is determined incorrectly, controlling the robot comprises determining a joint state that is most consistent with a set of previously executed actions.

9. The method of claim 1, wherein the method does not require prior information from a prior timestep.

10. The method of claim 1, wherein controlling the robot comprises sending inference actions to a noisy controller, and wherein the inference actions are observed.

11. The method of claim 1, wherein the camera parameters are initialized using structure from motion.

12. The method of claim 1, wherein the set of images are sampled from multiple cameras and wherein the camera parameters for each camera are initialized using triangulation.

13. The method of claim 1, wherein controlling the robot comprises fixing the optimized camera parameters and optimized structure parameters, and calculating the set of variables based on observed feature pixel locations and a target end effector pose for a subsequent timestep.

14. The method of claim 1, wherein a subset of the parameters are re-learned in response to a change in the system after training the generative model by sampling a new set of images and retraining the generative model while the parameters associated with remaining system components remain fixed.

15. The method of claim 1, wherein training the generative model is performed during robot operation.

16. The method of claim 1, wherein the generative model is trained using the set of images, wherein the set of images includes less than 100 images.

17. The method of claim 1, wherein the hidden variables comprise the end-effector pose and a feature pose, wherein the observed variables comprise actions from a prior timestep and the feature pixel locations, wherein the generative model comprises:

a structural sub-model, comprising the structure parameters, that relates the end effector pose to the feature pose; and a camera sub-model, comprising the camera parameters, that relates the feature pose to the feature pixel locations.

18. The method of claim 1, wherein the robot and cameras sampling the images are uncalibrated prior to training the generative model.

19. A system for robot control, comprising:

a robot, an end-effector connected to the robot, and a feature connected to the end-effector;

a set of cameras configured to capture images of the robot, the end-effector, and the feature;

a processing system configured to:

receive an image of the robot, the end-effector, and the feature;

determine a feature pixel location for the feature in the image;

determine a target end-effector pose;

determine an action for a next timestep based on the feature pixel location, the target end-effector pose, and a trained generative model, wherein the trained generative model was trained by:

initializing initial camera values for camera parameters of an untrained generative model, wherein the untrained generative model comprises: a camera sub-model comprising the camera parameters relating a feature pose to feature pixel locations, and a structural sub-model comprising structural parameters relating the feature pose to an end effector pose;

observing a set of training actions associated with resultant training feature pixel locations; and calculating optimized camera values for the camera parameters, optimized structure values for the structure parameters, and a training end-effector pose based on the initial camera values, the training feature pixel locations, and the set of training actions; and control the robot to perform the action.

20. The system of claim 19, wherein the robot is a robotic arm.

* * * * *